United States Patent [19]

Russell

[11] 4,356,526
[45] Oct. 26, 1982

[54] CONTROL CIRCUIT FOR RESETTING DRAWOUT CIRCUIT BREAKER UVR SOLENOID

[75] Inventor: Ronald R. Russell, Plainville, Conn.

[73] Assignee: General Electric Company, New York, N.Y.

[21] Appl. No.: 268,317

[22] Filed: May 29, 1981

[51] Int. Cl.³ .............................................. H02H 3/24
[52] U.S. Cl. ...................................... 361/59; 361/71; 361/92
[58] Field of Search .................... 361/92, 59, 194, 187, 361/71, 73, 74, 75, 86, 88, 90; 340/663

[56] References Cited

U.S. PATENT DOCUMENTS

| | | | |
|---|---|---|---|
| 3,590,325 | 6/1971 | McMillen et al. | 361/92 |
| 3,740,738 | 6/1973 | Kosanovich et al. | 361/92 X |
| 3,936,701 | 2/1976 | Wilson et al. | 361/92 |
| 4,011,484 | 3/1977 | Paice et al. | 361/59 |
| 4,183,071 | 1/1980 | Russell | 361/92 X |

Primary Examiner—Patrick R. Salce
Attorney, Agent, or Firm—Richard A. Menelly; Walter C. Bernkopf; Fred Jacob

[57] ABSTRACT

A control circuit utilizes a system voltage monitoring control relay for applying a DC control voltage across a UVR solenoid and a voltage dropping resistor to maintain the UVR in its reset condition in the absence of an undervoltage condition. An RC network maintains the UVR reset condition for momentary dips in the system voltage. If the UVR does drop out to trip its circuit breaker, a second relay temporarily switches out the dropping resistor to render the control voltage capable of electromagnetically resetting the UVR. To accommodate drawout breaker applications, means is provided to sense when the UVR is reconnected to the control circuit pursuant to automatically initiating a UVR reset function via the second relay.

8 Claims, 1 Drawing Figure

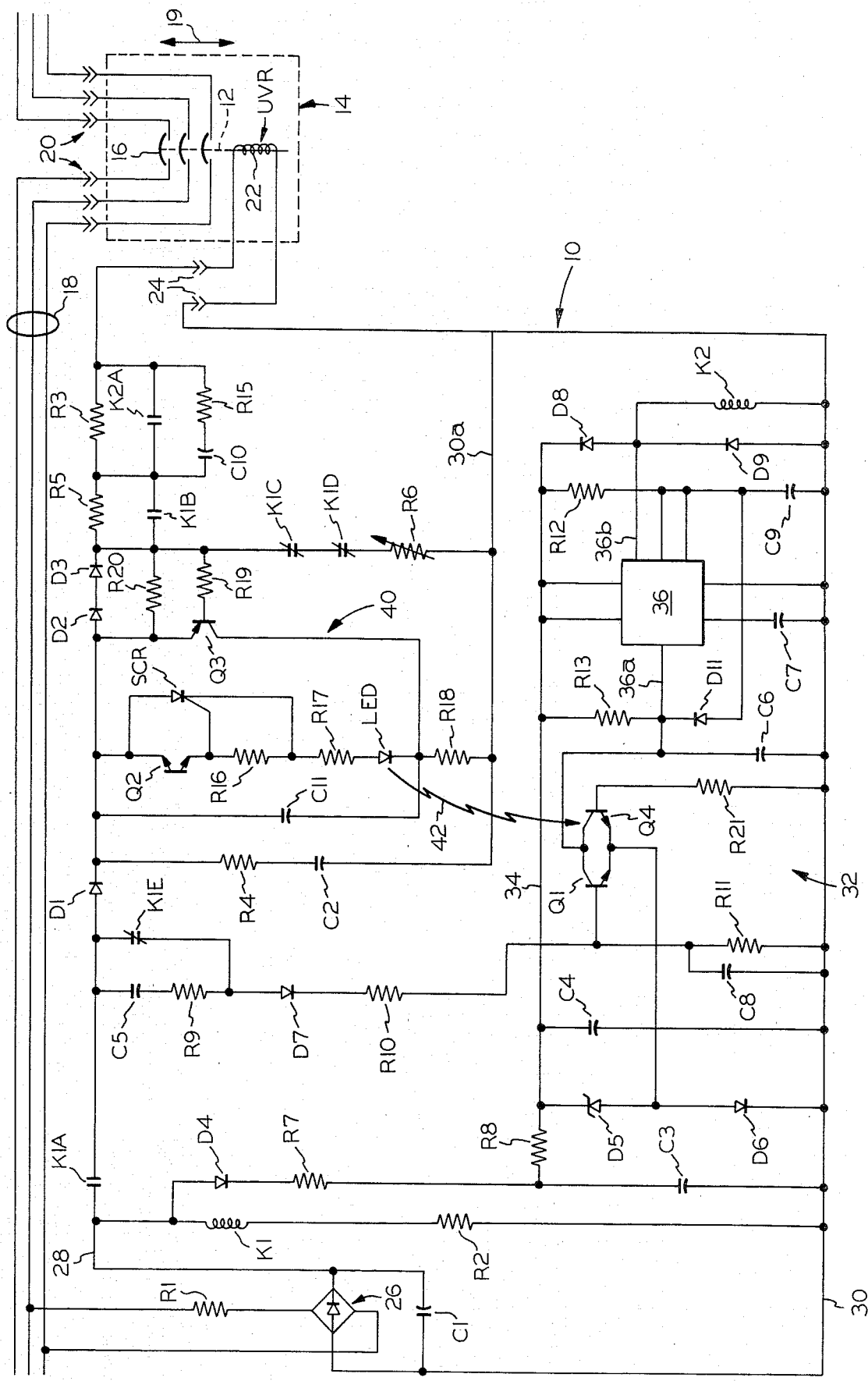

CONTROL CIRCUIT FOR RESETTING DRAWOUT CIRCUIT BREAKER UVR SOLENOID

BACKGROUND OF THE INVENTION

The present invention relates to undervoltage protection for power distribution circuits feeding voltage sensitive loads, such as motors.

Typically, undervoltage protection is provided by a so-called "undervoltage release" (UVR) device, such as a solenoid whose operating coil is connected to be energized by the distribution circuit voltage. If the system voltage remains above a predetermined minimum level, the solenoid coil is sufficiently energized to magnetically hold in the solenoid plunger against the bias of a calibrated retracting spring. When the system voltage falls below the predetermined minimum level, the retracting spring overpowers the diminished magnetic attractive forces developed by the solenoid coil, and the plunger is retracted. In the process, the plunger strikes a latch, tripping a circuit breaker to interrupt the distribution circuit. When the system voltage returns to normal, the magnetic attractive forces developed by the UVR solenoid coil are not sufficient to pull the plunger in. Consequently, the plunger must be reset mechanically, usually coincidentally with the opening movement of the breaker contact or the resetting of the breaker operating mechanism preparatory to reclosure of the breaker contacts.

The principal disadvantage to this straightforward approach to undervoltage protection is the inability of the undervoltage release solenoid to hold in for harmless, momentary dips in the system voltage or momentary losses of system power. Unless a mechanical dashpotting arrangement is provided, the UVR solenoid plunger will, under these circumstances, be pulled out by its retracting spring and the circuit breaker needlessly tripped. To overcome this disadvantage, undervoltage protection control circuits have been provided for developing a DC control voltage proportional to the system voltage which is then utilized to hold a UVR solenoid in as long as the system voltage remains above the pre-established minimum level. An energy storage capacitor, charged by the DC control voltage, is connected across the UVR solenoid coil. During momentary dips or losses of system voltage, a control relay drops out to remove the DC control voltage from the UVR solenoid. However, the energy storage capacitor then discharges through the UVR solenoid coil to hold it in, pending return of the system voltage to normal. If the system voltage returns to normal before the capacitor discharges, the control relay pulls in to reapply DC control voltage to the UVR solenoid before its plunger springs out to trip the circuit breaker. Using this approach, UVR solenoid drop-out delays of up to eight seconds can be readily achieved.

The utilization of an undervoltage protection control circuit lends practicability to an electrical approach, rather than a mechanical approach, to resetting the UVR solenoid after it has operated to trip the circuit breaker. One such approach is disclosed in my U.S. Pat. No. 4,183,071 wherein a DC control voltage is applied across the series combination of a dropping resistor and the UVR solenoid. A second control relay is momentarily actuated to short out the dropping resistor and thus apply the DC control voltage directly across the UVR solenoid, which is sufficient to reset it electromagnetically. After a predetermined delay, the second control relay is dropped out to re-insert the dropping resistor, and the voltage across the UVR solenoid is decreased to an operating level sufficient to maintain its reset condition.

While this approach of my above-noted issued patent is quite satisfactory for typical applications, it has the drawback of being "fooled" when the UVR solenoid is incorporated in a drawout circuit breaker. That is, when the circuit breaker is drawn out to its disengaged position, the electrical connection of the UVR solenoid with its switchboard mounted control circuit is broken when the switchboard-breaker secondary contacts break. The UVR solenoid thus drops out, but the system voltage monitoring control relay does not unless there is a fortuitous dip in the system voltage. Thus the control circuit does not know the UVR solenoid has dropped out and will not automatically execute its UVR solenoid reset procedure when the circuit breaker is racked back into its test position where the secondary contacts remake. The only recourse is to momentarily open the control circuit to drop out the system voltage monitoring control relay either manually or via switching logic sensing the arrival of the breaker at its test position from its disengaged position.

It is accordingly an object of the present invention to provide an improved undervoltage protection control circuit for electrical power distribution systems.

An additional object is to provide an undervoltage protection control circuit of the above character having application to controlling an undervoltage release solenoid incorporated in a drawout circuit breaker.

A further object is to provide an undervoltage protection control circuit of the above character which operates automatically to electromagnetically reset the undervoltage release UVR solenoid of a disengaged drawout circuit breaker upon the UVR solenoid being reconnected to the control circuit as the circuit breaker is racked toward its engaged position.

Another object is to provide a control circuit of the above character which is efficient in construction and reliable in operation.

Other objects of the invention will in part be obvious and in part appear hereinafter.

SUMMARY OF THE INVENTION

In accordance with the present invention, there is provided an undervoltage release (UVR) solenoid control circuit for affording undervoltage protection to a power distribution system feeding voltage sensitive loads. The undervoltage protection control circuit is energized by a DC control voltage derived from and proportional in magnitude to the distribution circuit voltage. If the system voltage is in excess of a predetermined minimum level, the control voltage is of a magnitude sufficient to hold in a first control relay. Normally open contacts of this relay remain closed to apply the control voltage across a UVR solenoid coil and a series voltage dropping resistor, pursuant to developing sufficient holding voltage to hold the UVR solenoid in. If the system voltage falls below the predetermined minimum level, the first control relay drops out to remove control voltage from the UVR solenoid. To prevent immediate drop-out of the UVR solenoid and consequent tripping of a circuit breaker protecting the distribution system, an energy storage capacitor, previously charged from the control voltage, discharges through the UVR solenoid coil to sustain the requisite holding voltage for a duration adjustably determined by the resistance included in the capacitor discharge path. If the system voltage returns to its nominal level before this capacitor fully discharges, the first control relay picks up to again apply full control voltage across the UVR solenoid coil and series dropping resistor, and the UVR solenoid does not drop out. On the other hand, if the distribution system is experiencing a serious undervoltage condition, the UVR solenoid will eventually drop out to trip the circuit breaker.

When full system voltage is eventually restored, the first control relay picks up to apply full control voltage across the UVR solenoid coil and dropping resistor. At the same time, the control voltage is applied to charge a resetting capacitor. Charging current drawn by this capacitor activates a timer network operating to momentarily pick up a second control relay and its contacts close to shunt out the dropping resistor. Consequently, full control voltage is applied directly across the UVR solenoid coil to electromagnetically reset the UVR solenoid. The second control relay is then dropped out by the timer network to switch the dropping resistor back into the control circuit. The voltage across the UVR solenoid coil abruptly drops to the holding voltage level sufficient to hold the UVR solenoid plunger in.

In accordance with a signal feature of the present invention, the control circuit is equipped with detector means for automatically initiating the above-described UVR resetting function when a UVR solenoid is disconnected from and then reconnected back into the control circuit, a situation occurring when the UVR solenoid as adapted to a circuit breaker applied in a drawout configuration. In this case, when the circuit breaker is drawn out to its disengaged position, the UVR solenoid is disconnected from the control circuit, and it drops out. In all likelihood, the system voltage will remain at its nominal level to hold in the first, system voltage monitoring, control relay while the UVR solenoid is disconnected. Thus, but for the present invention, the UVR solenoid would not be reset when it is connected back into the control circuit incident with the circuit breaker being drawn in toward its engaged position. To accommodate this situation, the detector means senses the reconnection of the UVR solenoid into the control circuit and thereupon activates the timer network to momentarily pick up the second, UVR resetting, control relay. The UVR reset function is thus carried forth in the same manner as generally described above following UVR drop-out in response to a genuine system undervoltage condition.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawing, in which the sole FIGURE is a detailed circuit schematic diagram of an undervoltage protection control circuit embodying the present invention.

DETAILED DESCRIPTION

Referring now to the drawing, an undervoltage protection control circuit, generally indicated at 10, is adapted to control an undervoltage release solenoid UVR having a plunger, diagrammatically indicated at 12, magnetically coupled to trip a power circuit breaker, generally indicated at 14, and thus effect the opening of breaker contacts 16 pursuant to interrupting a power distribution circuit 18 experiencing a potentially damaging undervoltage condition. Arrow 19 indicates that circuit breaker 14 is a drawout circuit breaker supported by a suitable racking mechanism for movement between an engaged position, wherein switchboard-circuit breaker primary line and load disconnects, generally indicated at 20, are engaged, and a disengaged position, wherein the primary disconnects are disengaged. Typically, there is provided an intermediate test position where the primary disconnects are also disengaged. The terminations of an operating coil 22 of the UVR solenoid are brought out to switchboard-circuit breaker secondary disconnects, commonly indicated at 24, which are engaged to connect the UVR solenoid into control circuit 10 while the circuit breaker is in its engaged and test positions. These secondary disconnects are disengaged while the circuit breaker is in its disengaged position.

To monitor the distribution system voltage, the control circuit inputs are connected directly, as shown, or indirectly via a voltage step-down transformer, across two phases of the three-phase distribution system. The phase-to-phase system voltage is applied via a current limiting resistor R1 across the inputs of a full-wave diode rectifying bridge, generally indicated at 26. The bridge outputs are connected to a positive voltage bus 28 and a negative voltage bus 30 across which is developed a DC control voltage of a magnitude indicative of the distribution system voltage. This DC control voltage is filtered by a capacitor C1 connected across the bridge outputs. If the system voltage is of a magnitude in excess of a pre-selected minimum level, the DC control voltage is of sufficient magnitude to pick up a control relay K1 connected in series with a resistor R2 across buses 28, 30. This relay then closes its normally open contacts K1A and K1B and opens its normally closed contacts K1C, K1D and K1E. It is seen that with the closure of relay contact K1A, positive DC control voltage is applied through diodes D1, D2 and D3, the closed relay contacts K1B, a voltage dropping resistor R3, to the upper termination of UVR solenoid coil 22, assuming secondary disconnects 24 are engaged. The lower side of the UVR coil is seen to be connected to negative voltage bus 30. The resistance value of dropping resistor R3 is selected such that under normal system voltage conditions, the control voltage magnitude is sufficient to develop a holding voltage across solenoid coil 22 adequate to hold UVR plunger 12 in against the bias of its retracting spring (not shown). Consequently, breaker contacts 16 remain closed to accommodate the distribution of electrical power over system 18.

In the event the system voltage falls below the preselected minimum level, the consequent reduction in DC control voltage causes control relay K1 to drop out. The opening of its contacts K1A removes the DC control voltage at the output of bridge 26 from the UVR solenoid. Should the system voltage reduction be only temporary, it is highly desirable that the UVR solenoid not drop out under these circumstances and needlessly trip circuit breaker 14. To accommodate these momentary system voltage reductions or losses, the series combination of a resistor R4 and an energy storage capacitor C2 is connected from the cathode of diode D1 to a bus 30a which is seen to be common with negative voltage bus 30. It will be appreciated that when control relay K1 first picks up, energy storage capacitor C2 is charged through closed relay contacts K1A, diode D1 and resistor R4 to store a voltage substantially equal to the DC control voltage. When the control voltage drops in response to a system undervoltage condition to drop-out control relay K1, capacitor C2 begins discharging through diodes D2, D3, resistor R5 (relay contacts K1B being open), resistor R3, and UVR coil 22 to preclude immediate drop out of UVR plunger 12. The rate at which capacitor C2 discharges and thus the drop-out delay imposed by the control circuit on the UVR solenoid is made adjustable by varying the resistance of an adjustable resistor R6 included in a shunt discharge path connected from the junction of diode D3 and resistor R5 to bus 30a through normally closed control relay contacts K1C and K1D. Diode D1 serves as a blocking diode to prevent the capacitor discharge current from flowing through other portions of the control circuit described below, while the inclusion of both relay contacts K1C and K1D in the shunt discharge path affords effective arc extinction upon opening to interrupt discharge current flow.

It is seen that if nominal system voltage is restored before capacitor C2 substantially discharges and thus before UVR solenoid drops out, control relay K1 again picks up to re-impose full control voltage across series dropping resistor R3 and UVR solenoid coil 22. With the re-establishment of the requisite holding voltage across coil 22, UVR plunger 12 remains held in, and thus circuit breaker 14 is not needlessly tripped in response to temporary, non-damaging system undervoltage conditions.

On the other hand, if nominal system voltage is not restored before capacitor C2 substantially discharges, the UVR solenoid plunger will indeed drop out to trip circuit breaker 14, and breaker contacts 16 open to interrupt the distribution system 18 in the face of a potentially damaging system undervoltage condition.

Once the UVR solenoid plunger 12 has dropped out to precipitate circuit breaker tripping, it then becomes necessary to reset the UVR solenoid by returning plunger 12 to its magnetically sustained, reset position. To achieve UVR solenoid resetting electromagnetically, control circuit 10 is provided with a reset network, generally indicated at 32. Low voltage power supply for this resetting network is obtained from bus 28 through a diode D4 and a pair of current limiting resistors R7 and R8. A zener diode D5 and a diode D6 serve to establish a regulated DC supply voltage between a positive low voltage bus 34, connected with resistor R8, and negative bus 30. Capacitor C3, connected from the junction of the resistors R7 and R8 to bus 30, and capacitor C4 connected across buses 34 and 30, provide the requisite filtering.

When control relay K1 is picked up to produce closure of its contacts K1A, the DC voltage across buses 28, 30 is imposed across the series combination of a capacitor C5, a resistor R9, a diode D7, and resistors R10 and R11. The junction between these last two resistors is connected to the base of a transistor Q1, whose emitter is connected back to the junction between diodes D5 and D6 and whose collector is connected via capacitor C6 to negative bus 30. The collector of transistor Q1 is also connected to the input 36a of a suitable timer network 36 which may be implemented in integrated circuit form, such as an Intersil 1CM75551PA. This timer network is shown connected between buses 34 and 30 for operating power. Capacitor C7 provides noise filtering, as does capacitor C8 connected in shunt with resistor R11. A resistor R12 and a capacitor C9 are connected in series between buses 34 and 30, and serve to time out the operating interval for timer network 36 by virtue of its connections with this series RC circuit. Also connected across buses 34 and 30 are a series pair of reversely poled diodes D8 and D9. The junction between these two diodes is connected with the output 36b of timer network 36 and also with the upper end of a control relay K2 whose end is connected to bus 30. The normally open contacts K2A for this control relay are seen to be connected in shunt with the voltage dropping resistor R3 for the UVR solenoid. The series combination of capacitor C10 and resistor R15, shunting relay contacts K2A, promote suppression of the arc drawn between these contacts as they break. Diode D9 is a free-wheeling diode for the coil of control relay K2, while diode D8 serves as a clamp to prevent the voltage at the upper end of this relay coil from exceeding the supply voltage on bus 34.

As the system voltage recovers from an undervoltage condition of sufficient duration to drop out the UVR solenoid, the regulated supply voltage on bus 34 is established before the system voltage rises to the level sufficient to pick up control relay K1. Capacitor C6 is rapidly charged through resistor R13 to raise the voltage at the input 36a of timer network 36 up to the supply voltage level on bus 34. The timer network is thereby conditioned to shunt charging current flowing through resistor R12 from the interval timing capacitor C9. When the system voltage monitoring control relay K1 does pick up and its contacts K1A close, charging current flows through capacitor C5, resistor R9, diode D7 and resistor R10 to provide base drive for transistor Q1. It will be noted that this had been completely discharged through contacts K1E when control relay K1 dropped out. Transistor Q1 goes into conduction, and capacitor C6 is discharged to drop the voltage at the network input 36a. The timer network is thus conditioned to cease diverting charging current from capacitor C9. Concurrently, the timer network applies an actuating voltage across the coil of control relay K2, and this relay picks up to close its contacts K2A. Dropping resistor R3 is thus shorted out, as is resistor R5 with the closure of normally open contacts K1B of control relay K1. Thus, virtually the full DC control voltage is applied across coil 22 of the UVR solenoid, and it picks up, retracting its plunger 12 to remove its reclosure restraint on circuit breaker 14.

While control relay K2 is being actuated from the timer network, charging current for capacitor C9 is no longer being diverted, and this capacitor charges toward the supply voltage on bus 34. When the voltage across this capacitor reaches a value of, for example, two-thirds of the supply voltage, timer network is signalled to conclude the actuation interval for control relay K2. An actuation interval of one second has been found to be adequate to insure reliable resetting of the UVR solenoid. When this control relay is dropped out by the timer network, contacts K2A open to reinsert dropping resistor R3, and thus establish the requisite holding voltage across the UVR solenoid coil 22, assuming nominal system voltage.

The just-described resetting procedure does not cover the situation when the UVR solenoid is dropped out, not in response to a system undervoltage condition, but rather because the circuit breaker has been racked out to its disengaged position effecting the incidental disconnection of the UVR solenoid from control circuit 10. It is seen that, as long as the system voltage is nominal, control relay K1 remains picked up, and capacitor C5 remains fully charged to deprive transistor Q1 of the requisite base drive to initiate UVR solenoid resetting as described above.

In accordance with the present invention, there is provided a detector network, generally indicated at 40, functioning to automatically initiate resetting of the UVR solenoid in response to its connection back into control circuit 10, as would typically occur when the circuit breaker is racked from its disengaged position to its test position where secondary disconnects 24 become reengaged. This detector network includes a suitable switching device Q2, such as a bi-directional diode thyristor of the type supplied by Motorola under the designation 1N5758A. This switching device is connected in series combination with resistors R16 and R17, a light emitting diode LED and a resistor R18 from the junction of diodes D1 and D2 to negative voltage bus 30a. A capacitor C11 is connected from the junction of diodes D1, D2 to the junction of diode LED and resistor R18. Also connected across these same two circuit points is the emitter-collector of a transistor Q3. A resistor R19 connects the base of this transistor to the junction between diode D3 and resistor R5, while a resistor R20 is connected in shunt with diodes D2 and D3. Finally, to enhance the switching characteristics of device Q2, a thyristor SCR has its anode connected to the upper terminal of the switching device, its gate connected to the lower terminal thereof, and its cathode connected to the junction between resistors R16 and R17.

While the UVR solenoid is connected into control circuit 10, the consequent current flowing through diodes D2 and D3 creates a forward biasing voltage on the base-emitter junction of transistor Q3 sufficient to render this transistor conductive. Its emitter-collector circuit thus shorts out switching device Q2, thyristor SCR and diode LED rendering these components inactive. However, while the UVR solenoid is disconnected from the control circuit, transistor Q3 is no longer forward biased, and it becomes non-conductive. As long as the system voltage remains up to thus hold control relay K1 in, the detector network 40 is activated to repetitively pulse diode LED. Specifically, capacitor C11 charges up to a voltage sufficient to break down switching device Q2, and current flows through resistors R16, R17 and diode LED causing the latter to emit a light signal indicated at 42. The voltage developed across resistor R16 provides gate voltage for triggering thyristor SCR into conduction, thereby shorting out switching device Q2 which then reverts to its non-conductive state. Capacitor C11 then discharges through the thyristor and diode LED. When this discharge current falls off to a low level, thyristor SCR becomes non-conductive, terminating activating current for diode LED. Capacitor C11 is then recharged to the voltage level sufficient to again break down switching device Q2, and the above-described operation repeats in relaxation oscillator fashion. The repetition rate may be, for example, 1000 hertz.

Diode LED is optically coupled with a photo-transistor Q4 whose collector and emitter are respectively commonly connected with the collector and emitter of transistor Q1. It is seen that the repetitive light signal 42 emitted by diode LED maintains photo-transistor Q4 virtually continuously conductive, with the result that the voltage at input 36a to timer network 36 is held at the requisite depressed level to activate the timer network. Control relay K2 is thus picked up, and its contacts K2A close to switch out voltage dropping resistor R3. To prevent the timing out of the normal one-second actuation interval for control relay K2, and thus to maintain its contacts K2A closed while the UVR solenoid is disconnected from control circuit 10, a diode D11 is connected from the junction between resistor R12 and capacitor C9 to the common collectors of transistors Q1 and Q4. It is seen that this diode is poled such as to divert charging current from capacitor C9 while photo-transistor Q4 is maintained conductive by the repetitive light signals emitted from diode LED. It should be pointed out at this point that the charging current diversion afforded by diode D11 is not a factor in the earlier described resetting procedure initiated to reset the UVR solenoid upon restoration of the system voltage from a protracted undervoltage condition. That is, capacitor C5 is a relatively small capacitor which charges very rapidly, and thus transistor Q1 is rendered conductive for only a momentary interval, considerably less than the nominal one-second actuation period for control relay K2.

From the foregoing description, it is seen that control relay K2 is held in its picked-up condition by timer network 36 and thus voltage dropping resistor R3 is switched out to await the reconnection of the UVR solenoid into control circuit 10. When reconnection is made, virtually the full DC control voltage is imposed across the UVR solenoid coil 22, and it is electromagnetically reset. The current flowing through diodes D2 and D3 with the reconnection of the UVR solenoid causes transistor Q3 to go into conduction, thus terminating light signal 42 emitted by diode LED. Photo-transistor Q4 thus goes non-conductive, and capacitor C9 then receives charging current to begin timing out the one-second actuation period for control relay K2 during which the reconnected UVR solenoid is reset.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A circuit for controlling an undervoltage release (UVR) solenoid having a plunger mechanically operative to trip a circuit breaker in response to a system undervoltage condition, said control circuit including, in combination:
   A. first and second buses having input ends coupled with an electrical distribution system for developing thereacross a DC control voltage proportional to the system voltage;
   B. a first control relay having an operating coil connected between said first and second buses to be picked up by said control voltage so long as said system voltage remains above a predetermined minimum level, said first control relay further including normally open first contacts connected in said first bus downstream from its operating coil;

C. a dropping resistor connected in series with the UVR operating solenoid coil across said first and second buses downstream from said first control relay contacts, whereby the pickup of said first control relay closes its first contacts to apply said control voltage across the series combination of said dropping resistor and UVR solenoid coil pursuant to developing sufficient holding voltage across the UVR solenoid coil to magnetically hold its plunger in a reset position and thus preclude tripping of the circuit breaker;

D. a UVR solenoid drop-out delay including an energy storage capacitor connected across said first and second buses downstream from said first control relay contacts to be charged by said DC control voltage while said first control relay is picked up and its first contacts closed, whereby upon drop-out of said first control relay in response to the system voltage falling below said predetermined minimum level, said energy storage capacitor discharges through the UVR solenoid coil to develop sufficient holding voltage to hold the plunger in its reset position for a predetermined duration pending restoration of normal system voltage; and E. a UVR solenoid resetting network including
  (1) a second control relay having an operating coil and normally open contacts connected in shunt with said dropping resistor,
  (2) a timer connected with said second control relay operating coil to effect the pickup of said second control relay for a pre-selected time interval in response to an initiating signal;
  (3) first means connected with said first and second buses downstream from said first control relay contacts for developing said timer initiating signal in response to the pickup of said first control relay following the dropout thereof in response to a system undervoltage condition, and
  (4) second means connected with said first and second buses downstream from said first control relay contacts for developing said timer initiating signal in response to the reconnection of the UVR solenoid into said control circuit while said first control relay is picked up following the disconnection therefrom as occurring on occasion when the circuit breaker is installed in a drawout configuration,
  (5) whereby, said second control relay is picked up under the control of said timer acting in response to said initiating signal to close said contacts thereof and thus shunt said dropping resistor for said pre-selected time interval such that virtually the full magnitude of said DC control voltage is applied across the UVR operating coil to develop sufficient magnetic attraction to draw the UVR solenoid plunger from its trip initiating, extended position back to its reset position.

2. The control circuit defined in claim 1, wherein said first means includes a reset capacitor and first transistor connected in circuit combination across said first and second buses, upon closure of said first control relay contacts, the charging current for said reset capacitor produced by said DC control voltage conditioning said first transistor to generate said timer initiating signal.

3. The control circuit defined in claim 1, wherein said second means includes a detector for signalling the reconnection of the UVR solenoid into said control circuit while said first control relay is picked up, and a first transistor responsive to said detector signalling for generating said timer initiating signal.

4. The control circuit defined in claim 1, wherein said second means includes a detector energized from said DC control voltage for generating a continuing signal while the UVR solenoid is disconnected from said control circuit, and a first transistor conditioned by said detector signal to generate said timer initiating signal, said timer including means connected with said first transistor to inhibit the timing out of said pre-selected time interval while said first transistor is conditioned by said detector signal, whereby said timer maintains said second control relay picked up while the UVR solenoid is disconnected from said control circuit, said detector including means for terminating said detector signal upon the reconnection of the UVR solenoid into said control circuit, whereupon said first transistor is reconditioned to remove the inhibition of said timer means such that said pre-selected time interval is then timed out.

5. The control circuit defined in claim 4, wherein said detector signal is a light signal emitted by a light-emitting diode, and said first transistor is a phototransistor optically coupled with said diode.

6. The control circuit defined in claims 3, 4 or 5, wherein said first means includes a reset capacitor and second transistor connected in circuit combination across said first and second buses, upon closure of said first control relay contacts, the charging current for said reset capacitor produced by said DC control voltage conditioning said second transistor to generate said timer initiating signal.

7. The control circuit defined in claims 4 or 5, wherein said detector includes a relaxation oscillator operating to generate said detector signal, and a clamp responsive to current flow through the UVR solenoid coil upon reconnection into said control circuit for disabling said oscillator.

8. The control circuit defined in claim 7, wherein said first means includes a reset capacitor and second transistor connected in circuit combination across said first and second buses, upon closure of said first control relay contacts, the charging current for said reset capacitor produced by said DC control voltage conditioning said second transistor to generate said timer initiating signal.

* * * * *